United States Patent [19]

Fellows et al.

[11] Patent Number: 5,217,418
[45] Date of Patent: Jun. 8, 1993

[54] DRIVELINES FOR WHEELED VEHICLES

[75] Inventors: Thomas G. Fellows, Barnet; Philip D. Winter, Blackburn, both of England

[73] Assignee: Torotrak (Development) Limited, England

[21] Appl. No.: 720,783

[22] PCT Filed: Jan. 5, 1990

[86] PCT No.: PCT/GB90/00018

§ 371 Date: Jul. 25, 1991

§ 102(e) Date: Jul. 25, 1991

[87] PCT Pub. No.: WO90/07660

PCT Pub. Date: Jul. 12, 1990

[30] Foreign Application Priority Data

Jan. 6, 1989 [GB] United Kingdom ............... 8900210

[51] Int. Cl.⁵ ..................... F16H 37/08; B60K 5/04; B60K 17/08
[52] U.S. Cl. ................................. 475/214; 180/297
[58] Field of Search ............... 74/194, 199, 200, 201; 475/214, 115, 186, 190, 192, 330; 180/292, 297, 368, 374, 375

[56] References Cited

U.S. PATENT DOCUMENTS

| | | | |
|---|---|---|---|
| 2,030,203 | 2/1936 | Gove et al. | 74/200 |
| 3,371,546 | 3/1968 | Spangler et al. | 174/200 |
| 3,453,904 | 7/1969 | Dangauthier | 74/199 |
| 3,557,636 | 1/1971 | Dangauthier | 74/199 X |
| 4,297,918 | 11/1981 | Perry | 74/201 X |
| 4,693,134 | 9/1987 | Kraus | 475/416 |
| 5,090,951 | 2/1992 | Greenwood | 74/200 X |

FOREIGN PATENT DOCUMENTS

| | | |
|---|---|---|
| 0043641 | 1/1982 | European Pat. Off. . |
| 0078124 | 5/1983 | European Pat. Off. . |
| 0271343 | 6/1988 | European Pat. Off. . |
| 3245045 | 6/1984 | Fed. Rep. of Germany . |
| 111527 | 4/1989 | Japan ............... 180/297 |
| 1078791 | 8/1967 | United Kingdom . |
| 1175857 | 1/1970 | United Kingdom . |
| 2100372 | 12/1982 | United Kingdom . |

Primary Examiner—Richard M. Lorence
Assistant Examiner—Khoi Q. Ta
Attorney, Agent, or Firm—Davis, Bujold & Streck

[57] ABSTRACT

A driveline for a wheeled vehicle in which two laterally-displaced driving wheels (37, 38) are driven by the output (33, 36) of a transmission of continuously-variable ratio. The transmission is capable of a "geared neutral" condition, and is driven by way of a slipless connection (5, 6, 7; 70-73) from the engine (2). The engine output axis (3), the engine/transmission connection and the variator output axis (15) are arranged in a "U"-shaped formation. Such an arrangement promotes a compact and well-balanced installation in which the vehicle centerline (1) may roughly bisect the engine, and the wheel half-shafts (43, 44) can be nearly equal in length. Alternative embodiments are described in which the output axis of the variator coincides with the final drive axis (FIG. 3), or is parallel to but displaced from it (FIG. 1).

12 Claims, 3 Drawing Sheets

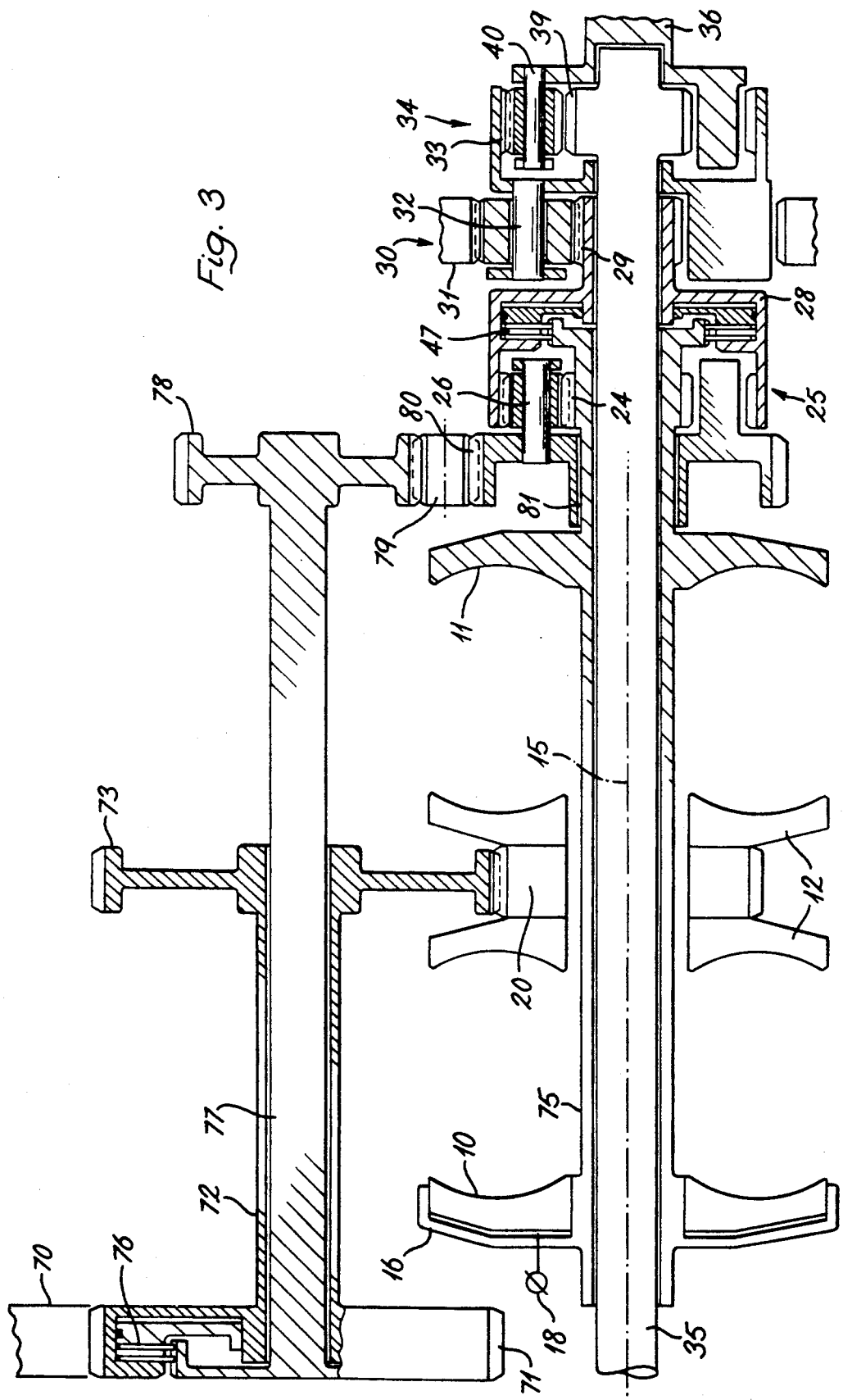

DRIVELINES FOR WHEELED VEHICLES

This invention relates to drivelines for wheeled vehicles. By "driveline" we mean the assembled series of driving components beginning with the engine or other prime mover, and ending with final driving shafts which rotate about substantially fixed axes and to which wheel units will be connected, typically by way of universal joints and half-shafts, but without including the wheel units, joints and half-shafts themselves. Such a driveline therefore includes the transmission, and a driveline according to the present invention includes a CVT, that is to say a transmission capable of continuous or stepless variation of the transmitted ratio. A particular feature of the present invention is that the driveline should have a slipless connection between the output member of the engine and the input to the CVT, and also the capability of adopting a condition, well known in the art as "geared neutral" or "geared idle", in which for a predetermined transmitted ratio the output member of the driveline is stationary in response to a driven and moving input. One obvious advantage of vehicles with drivelines having this capability is the facility for the driver to hold the vehicle at rest with the CVT under drive, and to move away from rest by simply changing the transmitted ratio, without the essential need for a starting clutch and/or a torque converter and/or some other component which is capable of disconnecting the engine from the transmission or at least of providing substantial slip between them. The present invention is therefore to be contrasted with known drivelines, of the kind shown in Patent Specification GB-A-1175857 for example, which are not capable of geared neutral and which include a torque converter between the engine and the CVT. By the term "slipless" connection we mean to include all connections which are intended, in use, to allow no significant slip between the parts connected: such connections include, for instance, some flexible belts as well as chain drives and gear trains.

The present invention applies particularly, but not exclusively, to drivelines including CVT's in which the ratio-varying component, or variator, is of the toroidal-race, rolling traction type. A well-known feature of such CVT's that their input and output axes of rotation coincide at all times: this promotes radial compactness and is to be contrasted, for instance, with the kind of CVT shown in GB-A-1175857 in which variation of the transmitted ratio is accompanied by relative displacement between the input and output axes of the variator.

The advantages of front-wheel drive vehicles, with drivelines in which the operating axis of the engine lies transverse relative to the vehicle, are now well understood. Where the transmission is a CVT however, and especially a CVT of the toroidal-race rolling traction type, a transverse engine presents a special problem. It is customary to locate the engine and the transmission in-line with their principal operating axes coincident, but the combined length of a typical engine and CVT may exceed the available transverse space in a road vehicle. One object of the present invention is to provide an alternative layout of engine and transmission which enables them to be accommodated together within a smaller transverse vehicle dimension. Another feature of a driveline according to the present invention is the opportunity it offers to provide a reasonable clearance between each of the driven wheels and the adjacent engine or transmission structure, so that the half shafts which are directly connected to the wheels may be of efficient length, and may be substantially equal in length. In some known transverse-engined vehicles the disposition of the engine and transmission structure dictates half-shafts very unequal in length. This has several disadvantages, including larger angular displacements at the shorter end from suspension movements, and unequal torsional stiffness unless the latter is avoided by increasing the diameter of the longer half-shaft.

The invention is defined by the claims, the disclosure of which is to be read as included in the disclosure of this specification. The invention will now be described, by way of example, with reference to the accompanying diagrammatic drawings in which:

FIG. 3 is a schematic and approximately vertical section through another driveline.

Figure 1:
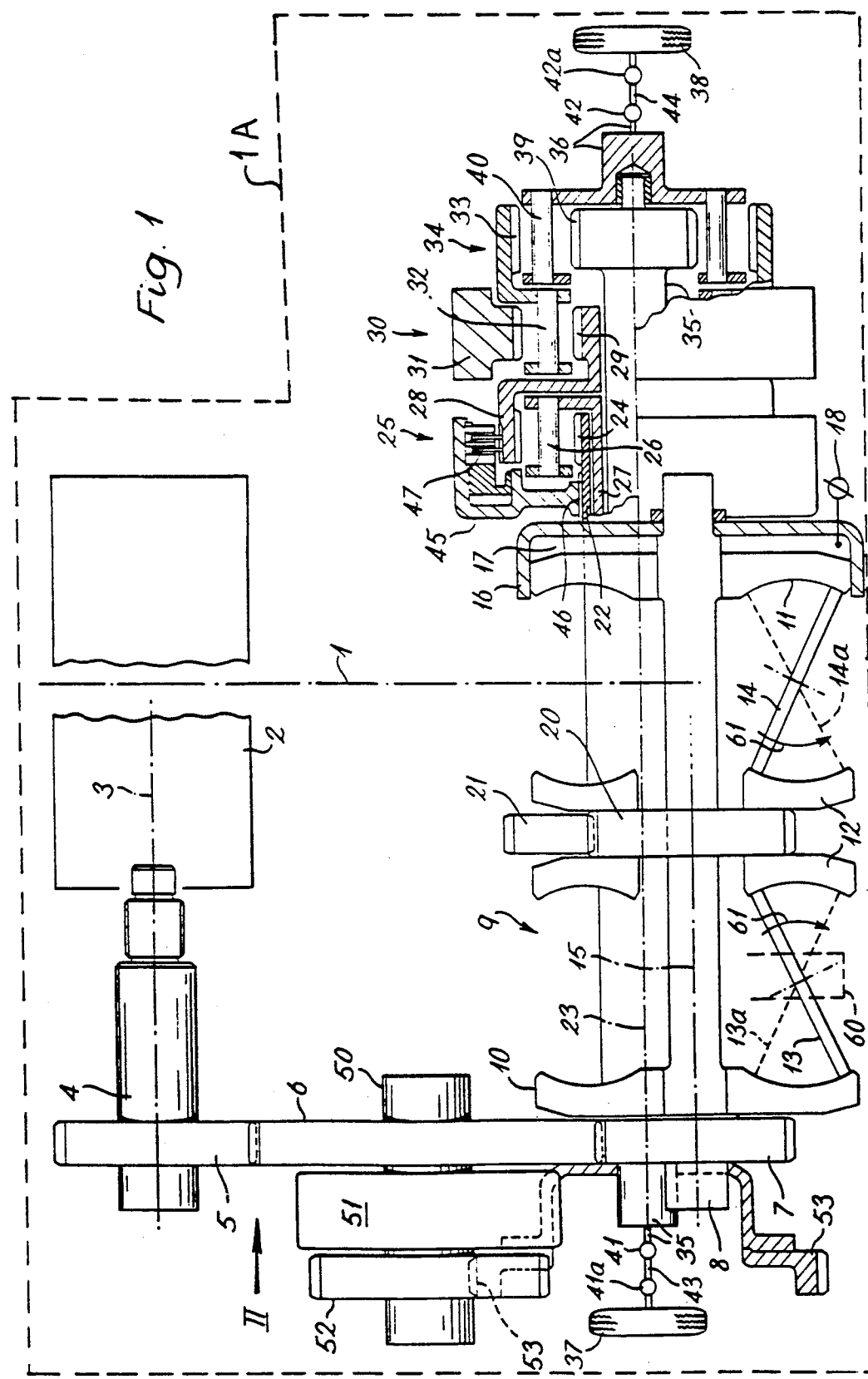
FIG. 1 is a plan view of one driveline.

In FIG. 1 reference 1 indicates the longitudinal centre line of the vehicle 1a (shown in ghost) in which the driveline is to be installed. An engine shown schematically at 2 is located with its output axis 3 arranged transversely relative to the vehicle, with the engine installed so that its structure extends substantially to both sides of centre line 1. Ideally the centre line 1 will roughly bisect the engine 2. The engine drives a stub axle 4 which constitutes the engine output member, and on which a gear 5 is mounted. Through an intermediate gear 6, engine drive is transferred without slip to a gear 7 mounted on the input shaft 8 of the ratio-varying unit or variator 9 (of the toroidal-race, rolling traction type) of a CVT having the facility to provide an extended range of transmitted ratios because it is capable of operating in two different mechanical configurations or "regimes". Two-regime CVT's of the toroidal-race, rolling traction type are now well known in the art: examples are described in detail in specifications GB-A-2100372, GB-A-1078791 and EP-A-0078124. The essential components of variator 9 include input discs 10 and 11, a single output disc unit comprising two connected and oppositely-facing discs 12, and two sets of rollers 13 and 14 (only one of each set being shown) to transmit drive between discs 10 and 12, 11 and 12 respectively. Disc 10 is fixed to shaft 8 whereas disc 11 is keyed to the shaft so that no mutual rotation about variator axis 15 is possible, but limited relative axial movement is. Disc 11 constitutes a piston movable within a cylindrical cap 16 which is fixed to shaft 8, and the chamber 17 between piston and cylinder is in communication with a source of pressurised fluid which is indicated at 18, and by which the necessary "end load" is exerted upon the discs to generate the appropriate traction between discs and rollers.

A gear 20 carried by the output disc unit meshes with a gear 21 mounted on a rotatable sleeve 22 coaxial with the axis 23 of the final drive of the transmission. Sleeve 22 carries the sun gear 24 of an epicyclic combination 25, which will be referred to as the "mixer epicyclic" of the CVT. The planet carrier 26 is carried on a second rotatable sleeve 27, also coaxial with axis 23, and the ring gear 28 is integral with the sun 29 of a second, speed reducing epicyclic combination 30 of which the ring gear 31 is fixed. The planet carrier 32 of epicyclic 30 is fast with the ring gear 33 of the final component of the CVT, namely a differential unit 34. The final drive comprises two driving shafts 35 and 36, which will in use rotate about substantially fixed axes and drive vehicle wheels 37 and 38 respectively by way of universal joints 41 and 42, half-shafts 43 and 44, and further universal joints 41a and 42a. The sun 39 of differential 34 is mounted on shaft 35, and the planet carrier 40 on shaft 36, and the same sense of rotation for shafts 35 and 36 is achieved by mounting the planet gears in pairs on carrier 40. Ideally the vehicle centre line 1 roughly bisects the CVT—that is, the assembly comprising variator 9 and the assembly of epicyclic combinations 25, 30 and 34—and is equidistant from the two inboard universal joints 41 and 42.

A flange 45, keyed at 46 to sleeve 22, carries a clutch 47 which engages with ring 28 and which will be referred to as the "high regime clutch". Shaft 50, on which intermediate gear 6 is mounted, also carries a clutch 51 which will be referred to as the "low regime clutch", and a further gear 52. When clutch 51 is disengaged, gear 52 idles as gear 6 rotates, but when the clutch is engaged and clutch 47 is disengaged the CVT is in "low regime" and the two gears 6 and 52 rotate together and gear 52 engages with a gear 53 fixed to sleeve 27. Sun 24 of mixer epicyclic 25 will be driven by output disc 12 by way of gears 20, 21 and sleeve 22, and planet carrier 26 will be driven by gears 52, 53 by way of sleeve 27. The resultant of their mutual rotation will drive the shafts 35, 36 by way of ring 28 and speed-reducing epicyclic 30.

Mechanism well known in the art, and shown only schematically at 60 in FIG. 1, is capable of tilting each of the rollers of sets 13, 14 about a diameter as indicated by the arrow 61, so as to vary the ratio transmitted between input discs 10, 11 and output disc 12. Mechanism 60 also operates, of course, so as to equate the instantaneous tilt angles of all the rollers 13, 14 so that they all transmit the same ratio at any instant. With the rollers 13, 14 in the tilt settings in which they are shown in full lines in FIG. 1, and with the transmission in low regime with clutch 47 disengaged and clutch 51 engaged, then for a given output speed of engine 2 the shafts 35, 36 will be rotating at the maximum reverse speed of which they are capable. As mechanism 60 now operates to tilt the rollers 13, 14 in the direction shown by the head of arrow 61, towards their other extreme positions 13a, 14a in which they are indicated in broken lines, the reverse speeds of shafts 35, 36 will diminish until a point is reached, before positions 13a, 14a are reached, at which sun 24 and planet carrier 26 are rotating at the appropriate speeds, as required by the epicyclic ratio, so that ring 28 is stationary and shafts 35, 36 are stationary also. The vehicle will therefore be at rest, in the condition known in the art as "geared neutral". As rollers 13, 14 then continue to tilt towards positions 13a and 14a, shafts 35, and 36 will gather speed again, but this time moving in the forward direction.

It is well known in the art that the ratios of the gears and other components which drive the mixer epicyclic 25 may be chosen so that if the rollers are in positions 13a and 14a, and clutches 51 and 47 are simultaneously and respectively disengaged and engaged, there is no instantaneous change in the sense or magnitude of the velocity of shafts 35 and 36. Such a change between "low" and "high" regimes is known as a "synchronous change". With clutches 51 and 47 set for high regime, gear 53 is no longer driven and carrier 26 is therefore free to idle. Clutch 47 connects sun 24 directly to ring 28 by way of flange 45, so that the ring 33 of differential 34 is driven directly from output discs 12 by way of gears 20 and 21, sleeve 22, sun 24 etc. If mechanism 60 now swings rollers 13, 14 back to their original extreme positions in which they are shown in full lines in FIG. 1, the forward speed of half-shafts 35 and 36 will respond by continuously increasing.

It will be seen from FIG. 1 that the engine 2, the driving connection (5, 6, 7) between the engine and the CVT, and the CVT itself are thus arranged in a distinctive "U"-shaped layout according to the invention. It should also specially be noted that the very central placing of the CVT promotes a good clearance, free of transmission structure, transversely-inboard of each of the road wheels 37 and 38, so that the two half-shafts 43 and 44 can be of efficient length and, more important still, can be of substantially equal length.

Figure 2:
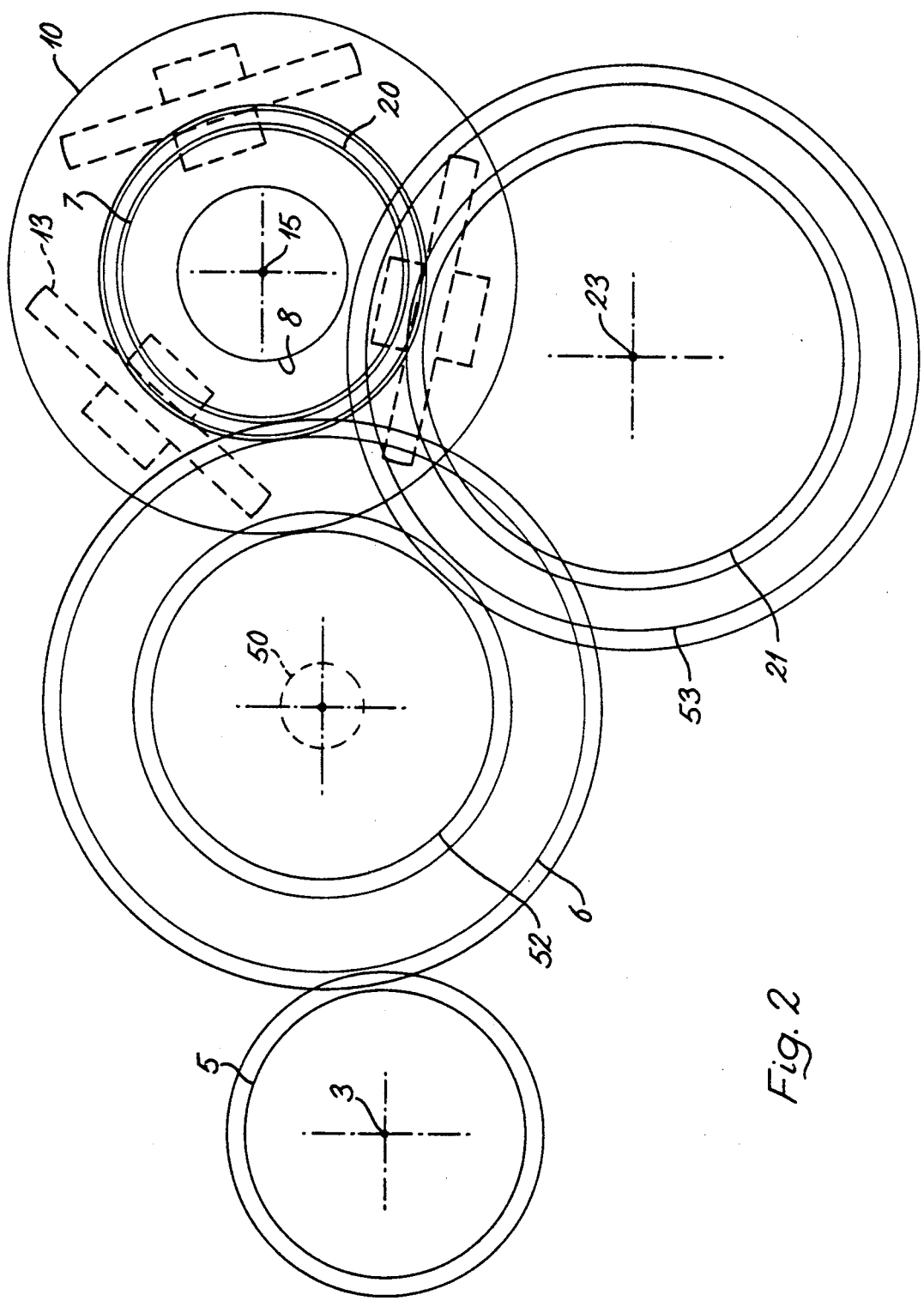
FIG. 2 is a schematic view in the direction of the arrow II in FIG. 1.

As well as those advantages, the driveline of FIGS. 1 and 2 has the advantage of a CVT—i.e. the combination of variator 9, epicyclics 25 and 30, and differential 34— that is particularly compact radially about the final drive axis 23 because the two sleeves 22, 27 which drive the components of epicyclic 25 are both coaxial with shaft 35. However such an arrangement of concentric but mutually-rotatable shafts presents known problems. In the alternative embodiment shown in FIG. 3 such a combination of one shaft and two sleeves, all coaxial, is avoided, with the added advantage for compactness that the variator 9 becomes coaxial with the final drive. In FIG. 3 drive is transmitted from the engine (not shown) by way of a chain 70 to a chain gear 71 mounted on a sleeve 72. Another gear 73, mounted on the same sleeve, meshes with gear 20 carried by the connected central discs 12 of variator 9. Discs 12 now therefore become the input member of variator 9 instead of the output member. Discs 10 and 11, now mounted on a common sleeve 75 which is rotatable about shaft 35, become the output member of the variator. Sleeve 75 is integral with sun 24 of mixer epicyclic 25, and high regime clutch 47 is operable to connect sun 24 directly to ring 28 as before. In high regime, therefore, drive is transmitted to shafts 35, 36 from the output member (sleeve 75) of variator 9 by way of sun 24, clutch 47, ring 28, speed-reducing epicyclic 30 and differential 34, exactly as in FIGS. 1 and 2. In low regime clutch 47 is disengaged and a low regime clutch 76 is engaged, connecting gear 71 with a shaft 77 which runs within sleeve 72. Shaft 77 carries a gear 78 which engages by way of an idler gear 79 (or alternatively, a chain) with a gear 80 which is mounted to rotate around an extension 81 of sleeve 75 and which carries the planet carrier 26 of mixer epicyclic 25. In low regime, therefore, sun 24 rotates in the same sense and at the same speed as the output member of variator 9, planet carrier 26 is driven through the low regime clutch 76 by way of gears 78–80, and ring 28 rotates at a resultant speed exactly as it did in FIGS. 1 and 2.

While the invention is not limited to the use of CVT's including variators of the toroidal-race, rolling traction type, it can offer particular advantages when such a variator is used. The embodiments shown in the Figures illustrate one such advantage, namely that the output from the centre discs 12 of the variator (in FIGS. 1 and 2) and the input of power to the same centre discs (in FIG. 3) is achieved without the use of drum-type connecting members which are well known in the art, and which would extend axially away from the centre discs and pass around the outside of one of the adjacent end discs 10 or 11. Such drum-shaped members inevitably add to the radius of the variator, which could well be reflected in ground clearance problems.

It should also be noted that although the invention applies particularly to drivelines in which the transmission is of two-regime type, as illustrated in all the Figures of the drawings, it applies also to transmissions capable of the geared neutral condition and capable of operating in more than two regimes, or indeed in only one regime. Such a single regime would of course be comparable with the "low" regime as described with reference to the drawings. Providing a second regime, or yet further regimes, extends the range of ratios that can be transmitted by the driveline as already explained.

We claim:

1. A driveline for a wheeled vehicle, comprising:
   an engine (2), having an output member (4) rotatable about an output axis (3);
   a CVT—that is to say, a transmission of continuously-variable ratio—having an output member and at least one input and including a differential unit (34) and a ratio-varying unit or variator (9) presenting an output axis of rotation (15), and having the capability of a "geared neutral" state in which for a predetermined variator setting the output member is stationary in response to a driven input;
   a slipless driving connection (5-7; 70-73) between the output member of the engine and at least such one input of the CVT;
   two substantially coaxial driving shafts (35, 36) rotating about substantially fixed axes, connected to and driven by the CVT output member and substantially parallel to the output axis (15) of the variator, and adapted respectively to drive two laterally-displaced driven wheels (37, 38) by way of universal joints (41, 42; 41a, 42a) and half-shafts (43, 44);
   in which the engine lies wholly within one leg of a "U"-shaped formation, the variator lies wholly within another leg of the same formation, the output axis of the variator and the substantially fixed axes of the driving shafts are coincident, and components of the slipless driving connection lie wholly within a foot of the same formation.

2. A driveline according to claim 1 in which the variator has an input axis of rotation which coincides with the output axis of rotation at all times.

3. A driveline according to claim 2 in which the variator is of the toroidal-race, rolling traction type.

4. A driveline according to claim 3 in which the variator is of the double-ended type comprising two opposite end discs which rotate together, and a central disc unit which rotates in the opposite direction, drive being transmitted between each of the end discs and the central disc unit by rollers.

5. A driveline according to claim 4 in which an input to the CVT is made by way of the two connected end discs of the variator.

6. A driveline according to claim 4 in which an input to the CVT is made by way of the central disc unit of the variator.

7. A driveline according to claim 1 in which the slipless driving connection includes gearing.

8. A wheeled vehicle containing a driveline comprising:
   an engine (2), having an output member (4) rotatable about an output axis (3);
   a transmission of a continuously-variable ratio having an output member and at least one input and including a differential unit (34) and a ratio-varying unit or variator (9) presenting an output axis of rotation (15), and having the capability of a geared neutral state in which for a predetermined variator setting the output member is stationary in response to a driven input;
   a slipless driving connection (5-7; 70-73) between the output member of the engine and at least such one input of the transmission of the continuously-variable ratio;
   two substantially coaxial driving shafts (35, 36) rotating about substantially fixed axes, connected to and driven by the output member of the transmission of the continuously-variable ratio and substantially parallel to the output axis (15) of the variator, and adapted respectively to drive two laterally-displaced driven wheels (37, 38) by way of universal joints (41, 42; 41a, 42a) and half-shafts (43, 44);
   in which the engine lies wholly within one leg of a "U"-shaped formation, the variator lies wholly within another leg of the same formation the output axis of the variator and the substantially fixed axes of the driving shafts are coincident, and components of the slipless driving connection lie wholly within a foot of the same formation.

9. A wheeled vehicle according to claim 8, wherein the variator has an input axis of rotation which coincides with the output axis of rotation at all times;
   the variator is of the toroidal-race, rolling traction type;
   the transmission of the continuously-variable ratio includes a mixing epicyclic combination and is of the two-regime type capable of operating in high and low regimes, in which each regime is engageable by operation of a respective clutch, and in which the axis of operation of the low regime clutch is parallel to but displaced from the output axes of both the engine and the variator;
   the transmission of the continuously-variable ratio has two inputs, in which one of these is to the variator and the other is to a component of the mixing epicyclic;
   the two inputs to the transmission of the continuously-variable ratio are made coaxially; and
   the location of the universal joints is such that the two half-shafts are substantially equal in length.

10. A driveline for a wheeled vehicle, comprising:
    an engine (2), having an output member (4) rotatable about an output axis (3);
    a CVT—that is to say, a transmission of continuously-variable ratio—having an output member and at least one input and including a differential unit (34) and a ratio-varying unit or variator (9) presenting an output axis of rotation (15), and having the capability of a "geared neutral" state in which for a predetermined variator setting the output member is stationary in response to a driven input;
    a slipless driving connection (5-7; 70-73) between the output member of the engine and at least such one input of the CVT;
    two substantially coaxial driving shafts (35, 36) rotating about substantially fixed axes, connected to and driven by the CVT output member, being one of and substantially parallel to or coincident with the output axis (15) of the variator, and adapted respectively to drive two laterally-displaced driven wheels (37, 38) by way of universal joints (41, 42; 41a, 42a) and half-shafts (43, 44);

in which the engine lies wholly within one leg of a "U"-shaped formation, the variator lies wholly within another leg of the same formation, and components of the slipless driving connection lie wholly within a foot of the same formation;

the variator has an input axis of rotation which coincides with the output axis of rotation at all times;

the variator is of the toroidal-race, rolling traction type; and the CVT includes a mixing epicyclic combination and is of the two-regime type capable of operating in high and low regimes, in which each regime is engageable by operation of a respective clutch, and in which the axis of operation of the low regime clutch is parallel to but displaced from the output axes of both the engine and the variator.

11. A driveline according to claim 10 in which the CVT has two inputs, in which one of these is to the variator and the other is to a component of the mixing epicyclic.

12. A driveline according to claim 11 in which the two inputs to the CVT are made coaxially.

* * * * *